(12) United States Patent
Tanimoto

(10) Patent No.: US 8,338,994 B2
(45) Date of Patent: Dec. 25, 2012

(54) POWER TOOL

(75) Inventor: Hideyuki Tanimoto, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 220 days.

(21) Appl. No.: 12/351,155

(22) Filed: Jan. 9, 2009

(65) Prior Publication Data

US 2009/0179507 A1    Jul. 16, 2009

(30) Foreign Application Priority Data

Jan. 15, 2008    (JP) ................. P2008-005963

(51) Int. Cl.
*H02K 9/06* (2006.01)
*H02K 3/04* (2006.01)

(52) U.S. Cl. .................. 310/50; 310/62; 310/180

(58) Field of Classification Search ............. 310/52, 310/54, 61, 62, 270, 50
See application file for complete search history.

(56) References Cited

U.S. PATENT DOCUMENTS

| | | | | |
|---|---|---|---|---|
| 1,229,401 | A * | 6/1917 | Black et al. | 476/14 |
| 2,048,096 | A * | 7/1936 | Bisley | 310/50 |
| 2,103,922 | A * | 12/1937 | Van Guilder | 366/201 |
| 2,512,905 | A * | 6/1950 | Willits | 310/62 |
| 2,539,003 | A * | 1/1951 | Agustoni | 310/50 |
| 3,121,813 | A * | 2/1964 | Pratt et al. | 310/50 |
| 3,194,993 | A * | 7/1965 | Hackney et al. | 310/43 |
| 3,725,706 | A * | 4/1973 | Lukens | 310/62 |
| 3,873,862 | A * | 3/1975 | Butler | 310/50 |
| 4,670,677 | A * | 6/1987 | Snider et al. | 310/63 |
| 5,081,384 | A | 1/1992 | Rausch | |
| 5,196,747 | A * | 3/1993 | Kress et al. | 310/89 |
| 5,387,087 | A * | 2/1995 | Chen | 416/188 |
| 6,411,000 | B1 * | 6/2002 | Rew | 310/62 |
| 7,067,952 | B2 * | 6/2006 | Neal | 310/254.1 |
| 7,166,939 | B2 * | 1/2007 | Voigt et al. | 310/47 |
| 7,252,581 | B2 * | 8/2007 | Numata et al. | 451/359 |

(Continued)

FOREIGN PATENT DOCUMENTS

CN    1652433 A    8/2005

(Continued)

OTHER PUBLICATIONS

Chinese Office Action, with English Translation, issued in Chinese Patent Application No. 200910001575.4, dated Dec. 14, 2010.

(Continued)

*Primary Examiner* — Burton Mullins
(74) *Attorney, Agent, or Firm* — McDermott Will & Emery LLP

(57) ABSTRACT

According to an aspect of the invention, there is provided a power tool including: a commutator motor including a rotor and a stator having a substantially cylindrical stator core; a fan provided to face one axial end of the stator core so as to be rotatable coaxially with the rotor; and a stator coil bundle fixed to an inner peripheral surface of the stator core, the stator coil bundle having a coil end portion that protrudes more than the stator core in a rotational axis direction of the rotor, wherein a minimum internal diameter of the coil end portion is smaller than a maximum external diameter of the fan, and wherein the coil end portion has a fan facing portion that faces the fan along a direction perpendicular to the rotational axis direction.

2 Claims, 7 Drawing Sheets

U.S. PATENT DOCUMENTS

| | | | |
|---|---|---|---|
| 7,449,810 B2 * | 11/2008 | Yokota et al. | 310/264 |
| 8,084,900 B2 * | 12/2011 | Schoen et al. | 310/50 |
| 2005/0168095 A1 * | 8/2005 | Tanimoto et al. | 310/208 |
| 2006/0043816 A1 | 3/2006 | Tanimoto et al. | |

FOREIGN PATENT DOCUMENTS

| | | | |
|---|---|---|---|
| CN | 1741349 A | | 3/2006 |
| JP | 56-115154 | * | 9/1981 |
| JP | 57-006546 | * | 1/1982 |
| JP | 10-136611 | | 5/1998 |
| JP | 2001-292544 | | 10/2001 |
| JP | 2002-154042 | | 5/2002 |
| JP | 2003-181778 | | 7/2003 |
| JP | 3687479 | | 6/2005 |
| JP | 2006-006005 | | 1/2006 |
| JP | 2006-67639 | | 3/2006 |

OTHER PUBLICATIONS

Microfilm of JP-UM No. S55-10049 (JP-UM-A No. S57-27760), 2000.

Japanese Office Action, w/ English translation thereof, issued in Japanese Patent Application No. 2008-005963, dated Mar. 6, 2012.

* cited by examiner

POWER TOOL

CROSS-REFERENCE TO RELATED APPLICATIONS

This application is based upon and claims a priority from prior Japanese Patent Application No. 2008-005963 filed on Jan. 15, 2008, the entire contents of which are incorporated herein by reference.

BACKGROUND OF THE INVENTION

1. Field of the Invention

The present invention relates to a power tool, and particularly, to a power tool including a commutator motor.

2. Description of the Related Art

As power tools, such as a grinder, a power tool which is configured to have a two-pole commutator motor as a power source has conventionally been known. As shown in FIGS. 13 and 14, the two-pole commutator motor 1020 includes a stator 1025 and a rotor 1021. The stator 1025 includes a substantially cylindrical stator core 1026. An inner peripheral surface of the stator is formed with a stator slot, and a portion of a stator coil bundle 1027 is housed in the stator slot, and the stator coil bundle 1027 is wound around the stator core 1026. The stator coil bundle 1027 has coil end portions 1028 and 1029 which protrude in an axial direction from a magnetic end corresponding to an axial end of the stator core 1026, and electric current flows to the stator coil bundle 1027 when a power tool 1001 which drives the motor 1020 is operated.

The stator coil bundle 1027 generates heat and rises in temperature during driving of the motor 1020. Motor output is suppressed due to such motor temperature rise. For this reason, it is general that the rotor 1021 is provided with a fan 1012 which rotates integrally with the rotor 1021, and the coil end portions 1028 and 1029 are cooled by cooling wind by the fan 1012. As a configuration which improves the cooling efficiency of the stator coil bundles 1027, as shown in FIGS. 13 and 14, a configuration in which the coil end portions 1028 and 1029 are formed thinly substantially in a plate shape and are made to extend in the axial direction of the stator core 1026, thereby increasing cooling surface area, is conceivable. Additionally, a configuration in which the coil end portion is split into two pieces, and a space through which cooling wind is made to pass is formed between the split coil end portions, thereby increasing the cooling surface area of the coil end portion, is conceivable. Such a two-pole commutator motor is described in, for example, Japanese Patent No. 3687479.

However, in the two-pole commutator motor provided in the conventional power tool, the coil end portion is made to extend in the axial direction of the stator core. Therefore, a problem occurs that the dimensions of the power tool in the axial direction of the stator core increase. Additionally, a problem occurs that the processing for splitting the coil end portion into two pieces is difficult, and the cost for manufacturing the power tool increases.

An object of the invention is to provide a power tool which can prevent dimensions from increasing, raise the cooling efficiency in a coil end portion, and suppress an increase in manufacturing cost.

SUMMARY OF THE INVENTION

According to an aspect of the invention, there is provided a power tool including: a commutator motor including a rotor and a stator having a substantially cylindrical stator core; a fan that is provided to face one axial end of the stator core, that has a plurality of blades and that is rotatable coaxially with the rotor; and a stator coil bundle that includes a bundle of magnetic wires and that is fixed to an inner peripheral surface of the stator core, the stator coil bundle having a coil end portion that protrudes more than the one end of the stator core in a rotational axis direction of the rotor, wherein, with respect to the rotational axis direction, a minimum internal diameter of the coil end portion is smaller than a maximum external diameter of the fan, and wherein the coil end portion has a fan facing portion that faces the fan along a direction perpendicular to the rotational axis direction.

Since the minimum internal diameter of the coil end portion having the rotational axis of the rotor as a center is smaller than the maximum external diameter of the fan, the coil end portion can be sufficiently made to face the fan, the cooling area of the coil end portion can be increased, and a configuration in which the coil end portion can be sufficiently cooled by the air flow by the coil end portion fan can be obtained.

Additionally, since the coil end portion has a fan facing portion which faces the fan in a direction perpendicular to the rotational axis of the rotor, the fan can be arranged within a space surrounded by the coil end portion, the fan can be sufficiently brought close to the coil end portion, and the coil end portion can be sufficiently cooled by the air flow by the fan. Additionally, the power tool in the rotational axis direction of the rotor can be made small. Accordingly, a small-sized high-output power tool can be obtained.

According to another aspect of the invention, there may be provided the power tool, wherein a rotational contour that faces the coil end portion is formed in accordance with a rotation of the fan, and wherein the fan facing portion outwardly extends along the rotational contour.

Since the fan facing portion extends toward a protruding end of the coil end portion along the end surface of the rotational contour surface, the cooling area of the coil end portion can be further increased, the cooling efficiency can be further raised, and the power tool with higher output can be obtained. Additionally, the fan can be brought closer to the coil end portion, and the power tool can be made smaller in the rotational axis direction of the rotor.

According to still another aspect of the invention, there may be provided the power tool, wherein each of the blades has an inclined portion at which the rotational contour is inclined with respect to the rotational axis direction, and wherein the fan facing portion extends along the inclined portion.

Since each of the blades has an inclined portion in which the end surface of the rotational contour surface becomes an inclined surface which is inclined with respect to the rotational axis direction of the rotor, and the fan facing portion extends toward the protruding end of the coil end portion along the inclined portion, the cooling area of the coil end portion can be further increased, the cooling efficiency can be further raised, and the power tool with higher output can be obtained. Additionally, the fan can be brought closer to the coil end portion, and the power tool can be made smaller in the rotational axis direction of the rotor.

According to still another aspect of the invention, there may be provided the power tool, wherein the stator core is formed of a plurality of split cores that are splittable from each other at split surfaces parallel to the rotational axis direction.

Since the stator core includes a plurality of split cores capable of being split into split surfaces parallel to the rotational axis of the rotor, the stator coil bundle including a bundle of magnetic wires can be fixedly arranged with broader area in an inner peripheral surface of the stator core, the cooling area of the coil end portion can be further increased, the cooling efficiency can be further raised, and the power tool with higher output can be obtained.

According to still another aspect of the invention, there may be provided the power tool, wherein the fan includes a centrifugal fan.

According to still another aspect of the invention, there may be provided the power tool, wherein at least the coil end portion of the stator coil bundle is resin-molded.

Since at least the coil end portion of the stator coil bundle is resin-molded, the rigidity of the coil end portion can be improved, the coil end portion which is thinner and broad in cooling area can be obtained, the cooling efficiency can be further raised, and the power tool with higher output can be obtained. Additionally, the coil end portion can be formed with high dimensional precision.

According to still another aspect of the invention, there may be provided the power tool, wherein a fan wind guide portion is provided to extend from the coil end portion so as to increase an air flow amount therearound.

Since a fan wind guide portion is provided to extend from the coil end portion in order to increase the amount of wind which passes along the fan, the air flow in a position of the rotational axis of the fan and in a position facing its vicinity can be increased, the cooling efficiency can be further raised, and the power tool with higher output can be obtained.

According to still another aspect of the invention, there may be provided the power tool, wherein a guide portion is provided to cover a space between an extending end of the coil end portion and a peripheral edge portion of the fan.

Since a guide portion is arranged so as to cover a space between an extending end of the coil end portion and a peripheral edge portion of the fan, the air flow in a position of the rotational axis of the fan and in a position facing its vicinity can be increased, the cooling efficiency can be further raised, and the power tool with higher output can be obtained.

According to still another aspect of the invention, there may be provided the power tool, wherein a housing in which the commutator motor is fixedly housed is provided, wherein the housing has a stator core facing portion that is positioned to face the stator core in a direction perpendicular to the rotational axis direction, and wherein the coil end portion and the stator core facing portion are positioned to face each other along the rotational axis direction.

Since the coil end portion and the stator core facing portion are positioned to face each other in the rotational axis direction of the rotor, the external diameter of a casing in the stator core facing portion can be reduced, and the power tool can be made small.

According to still another aspect of the invention, there may be provided the power tool, wherein at least a portion of the stator core facing portion forms a grip portion.

According to still another aspect of the invention, there may be provided the power tool, wherein the power tool is a disc grinder.

According to still another aspect of the invention, there is provided a power tool including: a commutator motor including a rotor and a stator having a substantially cylindrical stator core; a fan that is provided to face one axial end of the stator core, that has a plurality of blades and that is rotatable coaxially with the rotor; and a stator coil bundle that includes a bundle of magnetic wires and that is fixed to an inner peripheral surface of the stator core, the stator coil bundle having a coil end portion that protrudes more than the one end of the stator core in a rotational axis direction of the rotor, wherein the coil end portion is substantially plate-shaped, and wherein the coil end portion is formed so that an internal diameter thereof with respect to the rotational axis direction increases from a base portion that is positioned in the vicinity of the stator core toward a protruding end portion.

Since the coil end portion is substantially plate-shaped, and the internal diameter of the coil end portion having the rotational axis of the rotor as a center increases toward a protruding end of the stator core from a base portion of the coil end portion located in the vicinity of the stator core, the coil end portion can be sufficiently made to face the fan, the cooling area of the coil end portion can be increased, and a configuration in which the coil end portion can be sufficiently cooled by the air flow by the coil end portion fan can be obtained.

Additionally, the fan can be arranged within a space surrounded by the coil end portion, the fan can be sufficiently brought close to the coil end portion, and the coil end portion can be sufficiently cooled by the air flow by the fan. Additionally, the power tool in the rotational axis direction of the rotor can be made small. Accordingly, a small-sized high-output power tool can be obtained.

According to still another aspect of the invention, there is provided a power tool including: a commutator motor including a rotor and a stator having a substantially cylindrical stator core; a fan that is provided to face one axial end of the stator core, that has a plurality of blades and that is rotatable coaxially with the rotor; and a stator coil bundle that includes a bundle of magnetic wires and that is fixed to an inner peripheral surface of the stator core, the stator coil bundle having a coil end portion that protrudes more than the one end of the stator core in a rotational axis direction of the rotor, wherein the fan includes a centrifugal fan, wherein, with respect to the rotational axis direction, a maximum external diameter of the coil end portion is greater than or equal to a maximum external diameter of the stator core, and wherein the coil end portion forms a fan guide that defines a air flow path toward the centrifugal fan.

Since the maximum external diameter of the coil end portion having the rotational axis of the rotor as a center is greater than or equal to the maximum external diameter of the stator core, and the coil end portion forms a fan guide which forms a wind path to the centrifugal fan, the coil end portion can be sufficiently made to face the fan, the cooling area of the coil end portion can be increased, and a configuration in which the coil end portion can be sufficiently cooled by the air flow by the centrifugal fan can be obtained. Accordingly, a high-output power tool can be obtained.

According to still another aspect of the invention, there is provided a power tool including: a commutator motor including a rotor and a stator having a substantially cylindrical stator core; a fan that is provided to face one axial end of the stator core, that has a plurality of blades and that is rotatable coaxially with the rotor; and a stator coil bundle that includes a bundle of magnetic wires and that is fixed to an inner peripheral surface of the stator core, the stator coil bundle having a coil end portion that protrudes more than the one end of the stator core in a rotational axis direction of the rotor, wherein at least the coil end portion of the stator coil bundle is resin-molded, and wherein the coil end portion is formed so that an internal diameter thereof with respect to the rotational axis direction increases from a base portion that is positioned in the vicinity of the stator core toward a protruding end portion.

Since at least the coil end portion of the stator coil bundle is resin-molded, the rigidity of the coil end portion can be improved, the coil end portion which is thinner and broad in cooling area can be obtained, the cooling efficiency can be raised, and the power tool with high output can be obtained. Additionally, the coil end portion can be formed with high dimensional precision, the air flow in a position of the rotational axis direction of the fan and in a position facing its vicinity can be increased, the cooling efficiency can be raised, and the power tool with high output can be obtained.

Additionally, since the internal diameter of the coil end portion having the rotational axis of the rotor as a center increases toward a protruding end of the stator core from a base of the coil end portion located in the vicinity of the stator core, the coil end portion can be sufficiently made to face the fan, the cooling area of the coil end portion can be increased, and a configuration in which the coil end portion can be sufficiently cooled by the air flow by the coil end portion fan can be obtained.

According to still another aspect of the invention, there may be provided the power tool, wherein a fan wind guide portion is provided to extend from the coil end portion so as to increase an air flow amount therearound.

Since a fan wind guide portion is provided to extend from the coil end portion in order to increase the amount of wind which flows along the fan, the air flow in a position of the rotational axis of the fan and in a position facing its vicinity can be increased, the cooling efficiency can be further raised, and the power tool with higher output can be obtained.

DETAILED DESCRIPTION OF THE INVENTION

Figure 1:
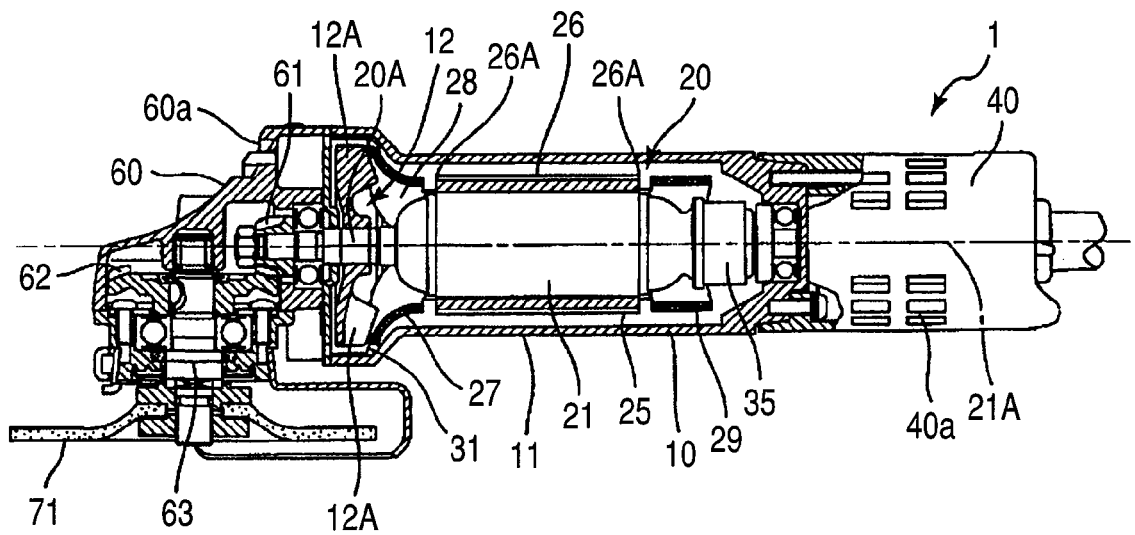
FIG. 1 is a partial sectional view showing a power tool according to an embodiment of the invention.

A power tool according to an embodiment of the invention will be described with reference to FIGS. 1 to 8. The power tool 1 is more specifically a disc grinder, and as shown in FIG. 1, mainly includes a housing 10 in which a motor 20 having a rotor 21, a stator 25 and a commutator 35 is housed and fixed, a grindstone 71 provided at a front end of the housing 10, a fan 12, a tail cover 40 having a power switch (not shown) and fixed to a rear end of the housing 10.

The inside of the housing 10 and the inside of the tail cover 40 communicates with each other, and the tail cover 40 is formed with an air inlet 40a which allow the inside of the tail cover 40 and the inside of the housing 10 to communicate with the atmosphere. The housing 10 has a stator core facing portion 11 is positioned to face a stator core 26 in a direction perpendicular to a rotational axis direction of the rotor 21. A gear cover 60 is fixed to and provided at front end of the housing 10, and the gear cover 60 is formed with a fan wind outlet 60a which allows the atmosphere and the inside of the housing 10 to communicate with each other, and allows fan wind to be discharged therethrough. An output shaft 20A of the motor 20 is adapted to be rotatable coaxially and integrally with the rotational axis of the rotor 21, and extends into the gear cover 60. A gear 61 which is coaxially and integrally rotatable with the output shaft 20A is provided in the vicinity of a tip of the output shaft. The output shaft 20A (rotational axis of the rotor 21) of the motor 20 coincides with the position of an axis 21A of a stator core 26.

A gear 62 which is fixed to a rotary shaft 63 rotatably supported within the gear cover 60 and which is rotatable coaxially and integrally with the rotary shaft 63 meshes with the gear 61, and a substantially disc-like grindstone 71 is coaxially attached to a lower end of the rotary shaft 63 shown in FIG. 1 so as to rotate integrally therewith. By this configuration, as the rotor 21 of the motor 20 rotates, the grindstone 71 is adapted to rotate.

Figure 2:
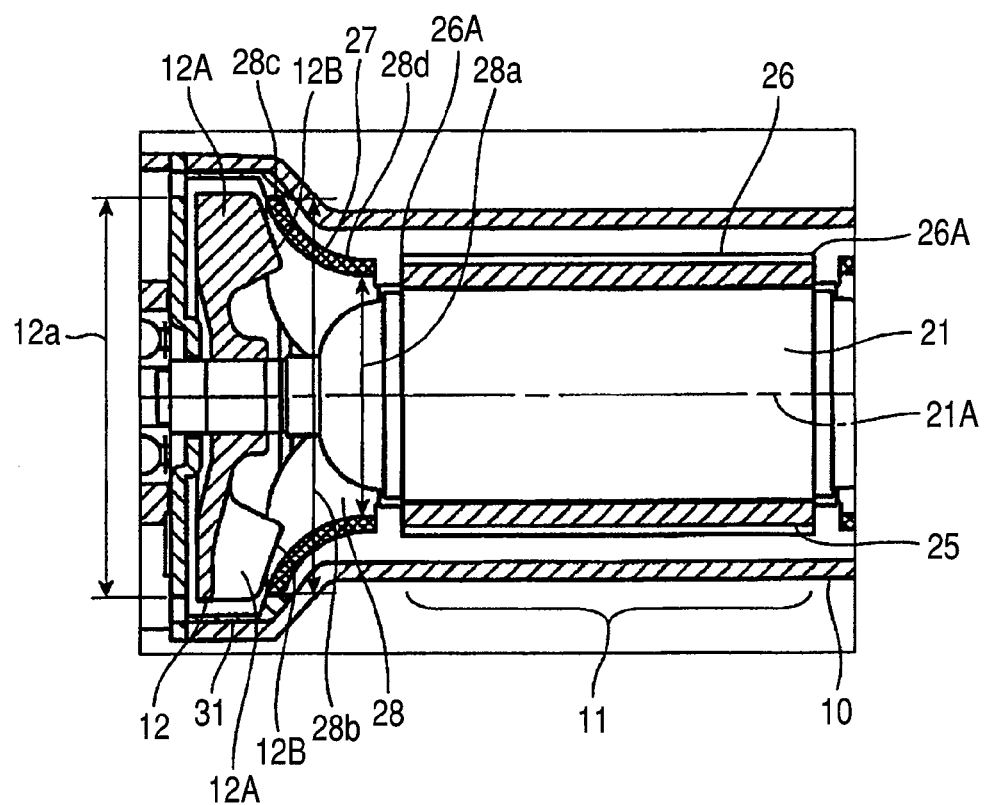
FIG. 2 is a sectional view showing chief parts of the power tool according to the embodiment.

The fan 12 is fixed to a portion of the output shaft 20A of the motor 20, i.e., a portion in the vicinity of the gear cover 60 within the housing 10, and is adapted to rotate coaxially and integrally with the output shaft 20A of the motor 20 as the rotor 21 rotates. The fan 12 includes a centrifugal fan having a plurality of blades 12A. The peripheral edge portions of the blades 12A form an imaginary rotational contour having a range where the fan 12 which rotates moves in a space as the fan 12 rotates. The external shape of the rotational contour is defined by an imaginary rotational contour surface, and the portion of the rotational contour surface which faces the motor 20 forms an end surface of the rotational contour surface which faces a fan-side coil end portion 28. The portion of the blade 12A which forms the end surface of the rotational contour surface, as shown in FIG. 2, has an inclined portion 12B which is inclined to form a given angle with respect to the rotational axis direction of the rotor 21, i.e., to the axial direction of the stator core 26. By the inclined portion 12B, the end surface of the rotational contour surface forms an inclined surface which is inclined to form a given angle with respect to the rotational axis direction of the rotor 21. The fan 12, as shown in FIG. 2, has a blade external diameter 12a with the rotational axis of the rotor 21 as a center.

The centrifugal fan discharges air radially outward of the centrifugal fan by the centrifugal force by the rotation of the centrifugal fan. The fan 12 includes such a centrifugal fan. Therefore, as the gap between the end surface of the rotational contour surface and the fan-side coil end portion 28 becomes small, i.e., as the distance between the inclined portion 12B of the blade 12A and the fan facing portion 28c of the fan-side coil end portion 28 becomes small, the cooling wind which cools the fan-side coil end portion 28 increases. The air which has flowed in from the air inlet 40a passes through the stator 25, flows to the peripheral edge portion of the fan 12 from the position of the axis of the fan 12 and its vicinity, and is discharged to the atmosphere from the fan wind outlet 60a. Since the fan 12 includes the centrifugal fan, the air flow around the rotational axis of the fan 12 and the position which faces its vicinity can be increased, the cooling efficiency for a stator coil bundle 27 can be raised, and a power tool 1 with higher output can be obtained.

Figure 4:
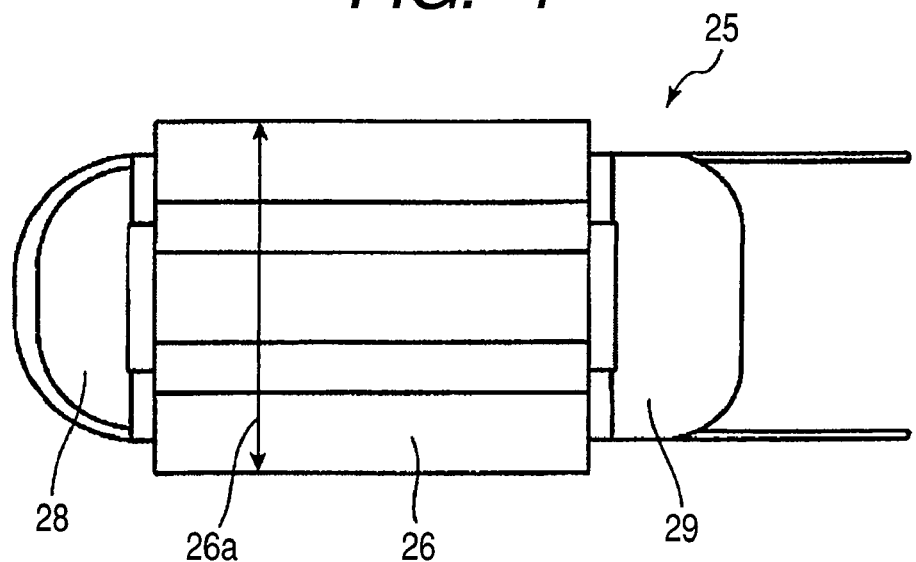
FIG. 4 is a plan view showing the stator.
Figure 7:
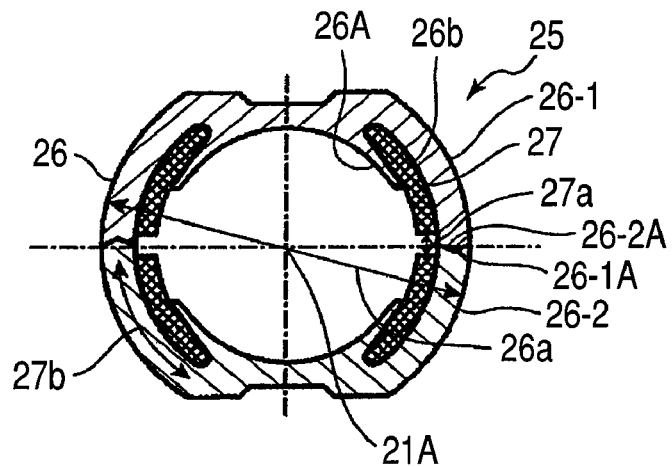
FIG. 7 is a sectional view taken along the line VII-VII of FIG. 3.

The stator 25 includes a substantially cylindrical stator core 26 having a length of about 45 to 60 mm in a right-and-left direction of FIG. 2 that is the axial direction and having a maximum external diameter 26a (FIG. 4). The stator core 26 has two magnetic poles, and as shown in FIG. 2, has magnetic pole ends 26A respectively provided at portions of the magnetic poles, i.e., in positions corresponding to axial ends of the stator core 26. As shown in FIG. 7, slots 26b which extend in a circumferential direction are formed in the vicinity of the magnetic pole ends 26A, and the stator coil bundles 27 including bundles of magnetic wires are respectively installed within the slots 26b. Each stator coil bundle 27 has the fan-side coil end portion 28 which protrudes substantially axially of the stator core 26 from the magnetic pole end 26A corresponding to one end that is a left end (FIG. 2) of the stator core 26, and a commutator-side coil end portion 29 (FIG. 1) which protrudes axially of the stator core 26 from the magnetic pole end 26A corresponding to the other end that is a right end (FIG. 2) of the stator core 26.

Figure 5:
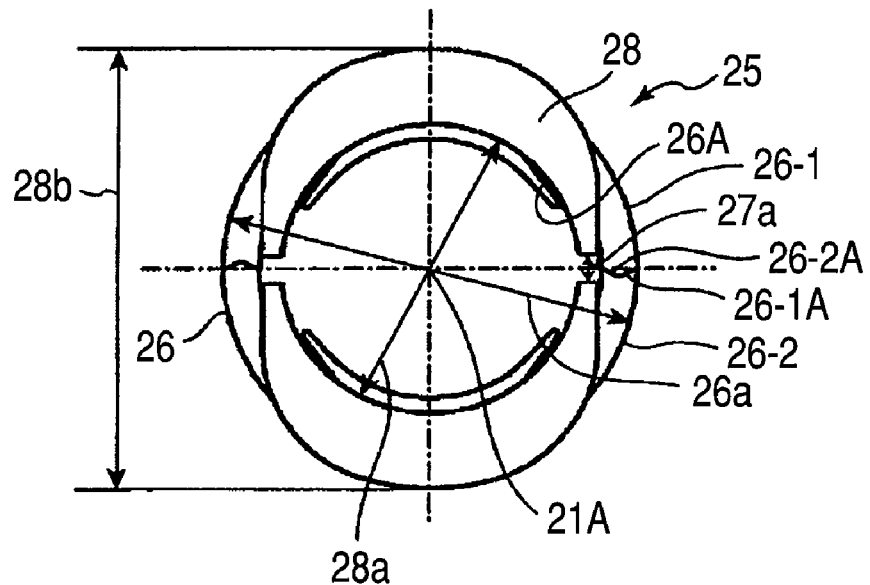
FIG. 5 is a front view showing the stator.
Figure 6:
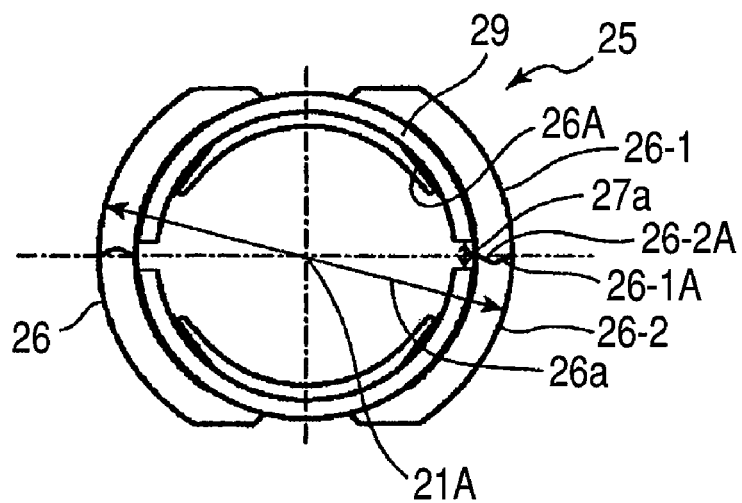
FIG. 6 is a rear view showing the stator.

As shown in FIGS. 5 to 7, the stator core 26 is adapted to be capable of being split into a pair of stator core portions 26-1 and 26-2. Split surfaces 26-1A and 26-2A of the stator core 26 are arranged on the way of a magnetic path which connects two magnetic poles of the stator 25. One of the split surfaces 26-1A and 26-2A of the stator core is ridge-shaped, and the other thereof is valley-shaped, and the ridge-shaped and valley-shaped split surfaces 26-1A and 26-2A positioned to be respectively parallel to the rotational axis of the rotor 21 (FIG. 1) which coincides with the output shaft 20A of the motor 20. After magnetic wires supplied from nozzles of a winding machine (not shown) are respectively wound around the stator core portions 26-1 and 26-2 and made into the stator coil bundles 27 such that the stator coil bundles 27 are installed within the slots 26b of the stator core portions 26-1 and 26-2, as shown in FIGS. 5 to 7, the ridge-shaped and valley-shaped stator core split surfaces 26-1A and 26-2A which are split into two pieces are combined together so as to abut on each other, thereby forming the substantially cylindrical stator core 26. In this state, the stator core 26 is installed in the housing 10.

Since the stator core 26 is adapted to be capable of being split as such, when magnetic wires are wound and made into the stator coil bundles 27, limitation of winding positions of the magnetic wires resulting from the size of the nozzles of the winding machine used to supply the magnetic wires can be reduced, and the magnetic wires can be wound around the stator core 26 such that the stator coil bundles 27 are arranged in the slots 26b, respectively, until a width 27a (FIGS. 5 to 7) between the stator coil bundle 27 on the side of one pole and the stator coil bundle 27 on the side of the other pole within the stator core 26 becomes 3 mm or less. For this reason, as shown in FIG. 7, a coil cross-section length 27b (FIG. 7) of the stator core 26 in the circumferential direction can be set to 15 mm to 20 mm, and can be set to be significantly large values compared with a coil cross-section length of 8 mm to 14 mm of a conventional power tool. As a result, the stator coil bundles 27 having significantly larger cooling area than the conventional power tool can be obtained, the surface area of the coil end portions 28 and 29 can be increased, and the cooling area becomes large, and consequently a disc grinder that is the power tool 1 with high output can be obtained.

As mentioned above, the housing 10 has the stator core facing portion 11 positioned to face the stator core 26 in the direction perpendicular to the rotational axis direction of the rotor 21, the fan-side coil end portion 28 and the stator core facing portion 11 are positioned to face each other in the rotational axis direction of the rotor 21, and the stator core facing portion 11 forms an grip portion of a disc grinder that is the power tool 1. For this reason, the external diameter of a casing in the stator core facing portion 11 can be made small, the air that is cooling wind can be easily made to flow along the fan-side coil end portion 28, and the cooling efficiency in the stator 25 can be improved. The internal diameter of the fan facing portion 28c having the rotational axis of the rotor 21 as a center can be made small to a value approximate to the maximum external diameter 26a (FIG. 4) of the stator core 26, and a small-sized power tool 1 with high output can be obtained. Since the stator core facing portion 11 forms the grip portion of the disc grinder, the power tool 1 in which the external diameter of the grip portion is set to a moderate size can be obtained, and a disc grinder as the power tool 1 which can facilitate gripping and can improve the working efficiency can be obtained.

The whole stator coil bundle 27 is molded of heat-curable resin, and accordingly, the fan-side coil end portion 28 and the commutator-side coil end portion 29 are also molded. The fan-side coil end portion 28 and the commutator-side coil end portion 29 are thin plate-shaped. More specifically, the commutator-side coil end portion 29, as shown in FIG. 3, is formed in such a shape that portions of a substantially cylindrical shape, i.e., portions corresponding to the vicinities of imaginary extending lines of the stator core split surfaces 26-1A and 26-2A are cut out, and the upper side of FIG. 3 forms one pole side, and the lower side thereof forms the other pole side.

Figure 3:
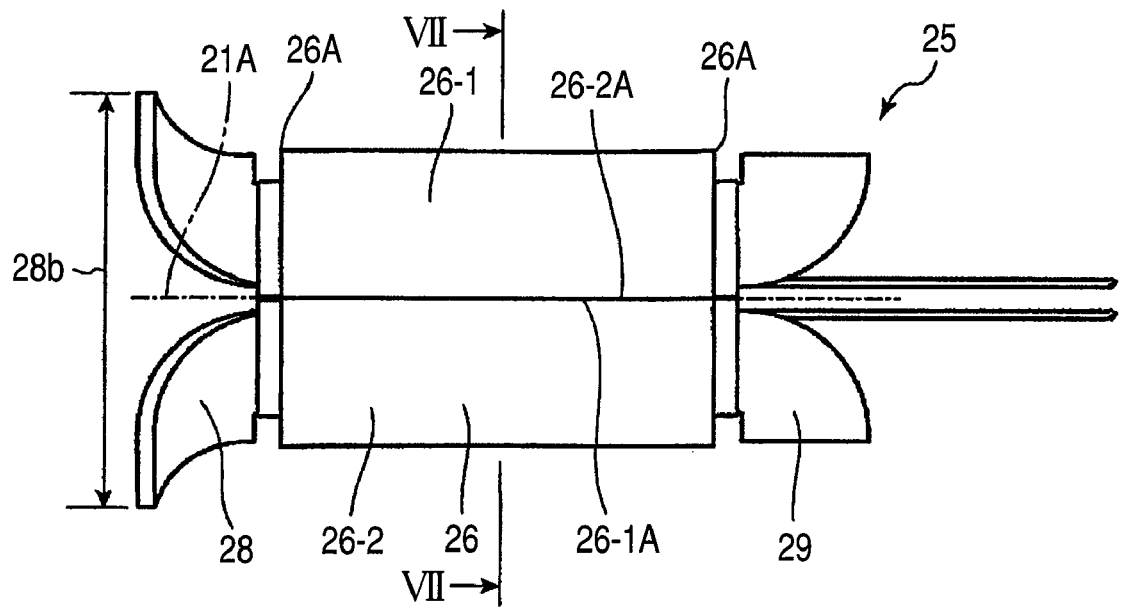
FIG. 3 is a side view showing a stator of a motor of the power tool in a state where a fan wind guide is not provided.

The portion of the fan-side coil end portion 28 in the vicinity of the magnetic pole end 26A of the left end (shown in FIG. 3) of the stator core 26, as shown in FIG. 3, is formed in such a shape that portions of a substantially cylindrical shape, i.e., portions corresponding to the vicinities of imaginary extending lines of the stator core split surfaces 26-1A and 26-2A are cut out. Also, the fan-side coil end portion 28 is gradually separated from the axis of the stator core 26 toward an extending end of the fan-side coil end portion 28 located at a left end of FIG. 3, is formed in a shape that is directed to a direction along the inclined portion 12B of the blade 12A of the fan 12 as shown in FIG. 2, and is formed in such a shape that its diameter is increased with the axis of the stator core 26 as a center toward a tip of the fan-side coil end portion 28 like a tip portion of a horn or morning glory. The upper side (FIG. 3) of the fan-side coil end portion 28 forms one pole side, and the lower side thereof forms the other pole side.

As such, since the fan-side coil end portion 28 is formed such a shape such that its diameter is increased toward an extending end, the coil end portion has a minimum internal diameter 28a (FIG. 2) with the axis of the stator core 26 as a center in a position in the vicinity of one end of the stator core 26, and has a maximum external diameter 28b (FIG. 2) in the position of the extending end. The minimum internal diameter 28a is smaller than a blade external diameter 12a of the fan 12 mentioned above, and is greater than or equal to the maximum external diameter 26a (FIG. 4) of the stator core 26 mentioned above. For this reason, the fan-side coil end portion 28 can be sufficiently made to face the fan 12, the cooling area of the fan-side coil end portion 28 can be increased, and a configuration in which the fan-side coil end portion 28 can be sufficiently cooled by the air flow by the fan 12 can be obtained.

The fan-side coil end portion 28, as shown in FIG. 2, has the fan facing portion 28c which faces the fan 12 in the direction perpendicular to the rotational axis of the rotor 21. That is, the portion of the fan 12 which faces one end of the stator core 26, i.e., a portion of the rotational contour which faces the fan-side coil end portion 28 is arranged within a space surrounded by the fan-side coil end portion 28. For this reason, the fan-side coil end portion 28 and the inclined portion 12B of the blade 12A of the fan 12 are arranged to face each other via a narrow gap of about 2 mm in the axial direction of the rotor 21. In more detail, the fan facing portion 28c is formed in a shape that it extends with a gap of about 0.5 to 2 mm being kept between the fan facing portion and the inclined portion 12B of the blade 12A.

The length of the fan facing portion 28c in the extension direction of the fan-side coil end portion 28 shown in FIG. 2 is about 3 to 7 mm. In case of a conventional power tool, it was necessary to lengthen the housing 10 in the axial direction of the rotor 21 by 3 to 7 mm that is the length of the fan facing portion 28c. However, since the housing is curved as shown in FIG. 2 in this embodiment, it is possible to dispense with lengthening the housing 10 in the axial direction of the stator core 26 in this way, and the power tool 1 can be made small. Since the fan facing portion 28c is arranged as close as about 2 mm in the axial direction of the rotor 21 from the blade 12A where the air that is cooling wind turns the greatest, the cooling efficiency of the stator 25 having the fan-side coil end portion 28 can be improved significantly. A cross-section 28d of the fan-side coil end portion 28 in the extension direction of the fan-side coil end portion 28 shown in FIG. 2 has a length of about 15 mm to 20 mm in the extension direction, and a thickness of about 2 mm to 5 mm, and is formed in a flat shape compared with general coil end portion dimensions (a length of 8 mm to 114 mm and a thickness of about 5 mm to 10 mm), and the fan-side coil end portion 28 of this embodiment has a structure in which cooling surface area is very broad.

Moreover, since the fan facing portion 28c extends toward a protruding end of the fan-side coil end portion 28 along the end surface of the rotational contour surface of the fan 12, i.e., along the inclined portion 12B of the blade 12A of the fan 12, the cooling area of the fan-side coil end portion 28 can be further increased without increasing the number of parts, the cooling efficiency can be further raised, and the power tool 1 with higher output can be obtained. The fan 12 can be brought closer to the fan-side coil end portion 28, and the power tool 1 can be made smaller in the rotational axis direction of the rotor 21. The fan-side coil end portion 28 is functioning as a fan guide which increases the air flow around the rotational axis of the fan 12, thereby increasing cooling wind.

Since the fan-side coil end portion 28 is resin-molded, the rigidity of the fan-side coil end portion 28 can be improved. The fan-side coil end portion 28 can be formed with high dimensional precision. For this reason, even in the power tool 1 with large vibration, there is no case that the rotor 21 and the coil end portions 28 and 29 come into contact with each other and are damaged, during the operation of the power tool 1. As a result, the fan-side coil end portion 28 and commutator-side coil end portion 29 which are thinner and sufficiently broad in cooling area can be obtained, the cooling efficiency can be further raised, and the power tool 1 with higher output can be obtained.

Figure 8:
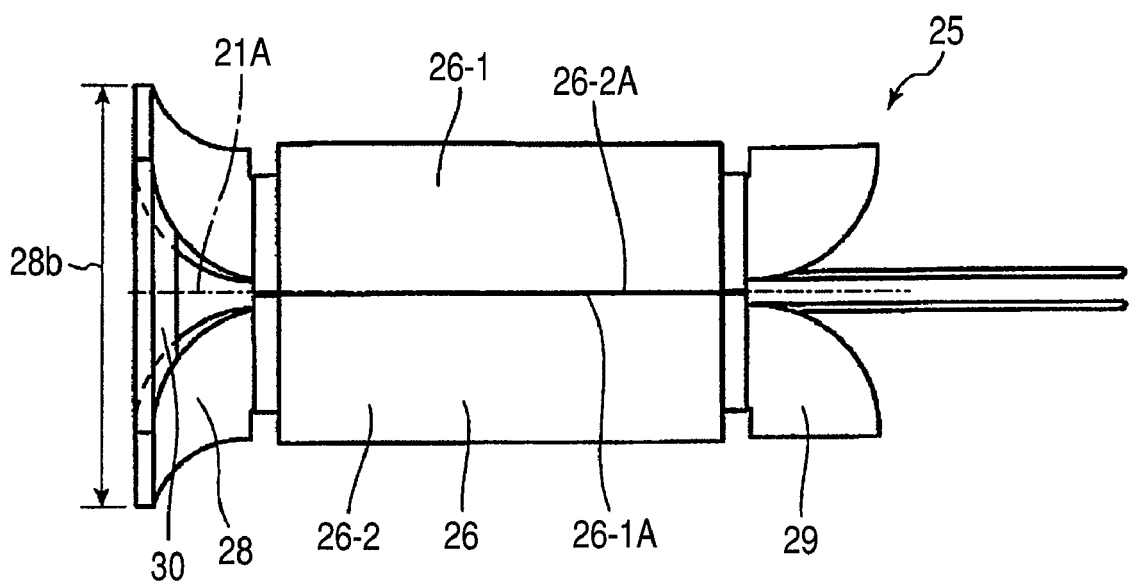
FIG. 8 is a side view showing the stator.

As shown in FIG. 8, there is a case that a fan wind guide portion 30 made of resin constituting a resin mold is fixed to the fan-side coil end portion 28 by adhesion. The fan-side coil end portion 28 is formed in such a shape that portions of a substantially cylindrical shape, i.e., portions corresponding to the vicinities of imaginary extending lines of the stator core split surfaces 26-1A and 26-2A are cut out as earlier mentioned. However, the fan wind guide portion 30 extends from the fan-side coil end portion 28 so as to bury the cutout portion, and connects the fan-side coil end portion 28 on the side of one pole and the other fan-side coil end portion 28, the fan-side coil end portion 28 and the fan wind guide portion 30 are formed in a shape like a tip portion of a horn or morning glory, and the tip (left end of FIG. 8) of the fan-side coil end portion 28 is formed in a substantially annular shape with the rotational axis of the rotor 21 as a center. Since the fan wind guide portion 30 is provided, the amount of wind which flows along the fan 12 can be increased, the cooling efficiency can be further raised, and the power tool 1 with higher output can be obtained. Additionally, the discharge of air that is cooling wind of the fan 12 becomes smooth, and fan noises can be reduced.

As shown in FIG. 2, a fan guide 31 which is connected to the tip of the fan-side coil end portion 28 and extends toward the housing 10 is provided. Then fan guide 31 extends from the tip of the fan-side coil end portion 28 in the extension direction of the fan-side coil end portion 28, leads to an inner peripheral surface of the housing 10, and extends in a left direction of FIG. 2 along the inner peripheral surface of the housing 10, as shown in FIG. 2, from that portion, thereby surrounding the surroundings of the fan.

Figure 9:
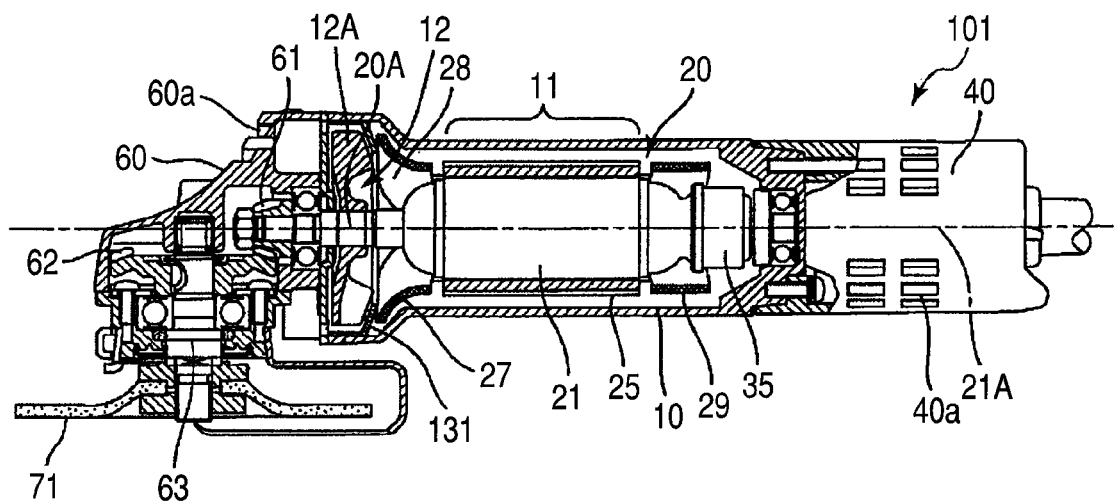
FIG. 9 is a partial sectional view showing a power tool according to a first modification of the embodiment.
Figure 10:
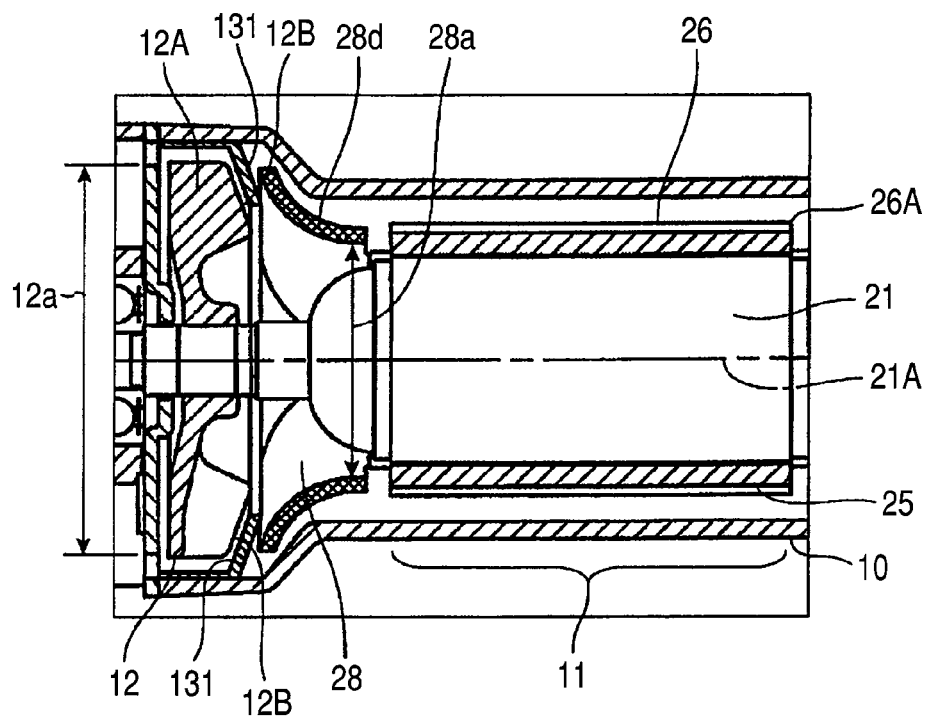
FIG. 10 is a sectional view showing chief parts of the power tool according to the first modification of the embodiment.

The power tool according to the invention is not limited to the above-described embodiment, and various modifications or improvements can be made within the scope defined in the claims. For example, a guide portion which is arranged so as to cover a space between an extending end of a coil end portion and a peripheral edge portion of the fan 12 may be provided. In this case, as shown in FIGS. 9 and 10, a guide portion 131 may be provided so as to cover a portion of the inclined portion 12B of the fan 12, i.e., a space between a peripheral edge portion of the end surface of the rotational contour surface and an extending end of the fan-side coil end portion 28 having the rotational axis of the rotor 21 as a center. By providing the guide portion 131 in this way, the air flow around the rotational axis of the fan 12 can be increased, the cooling efficiency can be further raised, and a power tool 101 with higher output can be obtained.

The fan-side coil end portion 28 has a dimension of about 15 mm to 20 mm in its extension direction, and is significantly large compared with a dimension of about 8 mm to 14 mm in a conventional power tool. However, as described in this embodiment, the fan-side coil end portion extends so as to roll back in a direction apart from the rotational axis of the rotor 21, the guide portion 131 can be housed in the space between the housing 10 and the fan-side coil end portion 28. Therefore, while the cooling surface area of the fan-side coil end portion 28 improves, the dimensions in the rotational axis direction of the rotor 21 are not different from the conventional power tool. Moreover, when dust such as gravels can be sucked in from air inlet 40a during the operation of the power tool 101, the dust is bounced by the blade 12A which rotates in the fan 12. In this case, the guide portion 131 protects the fan-side coil end portion 28, and prevents the dust from colliding against the fan-side coil end portion 28. As a result, the power tool 101 with long life span can be obtained.

Figure 11:
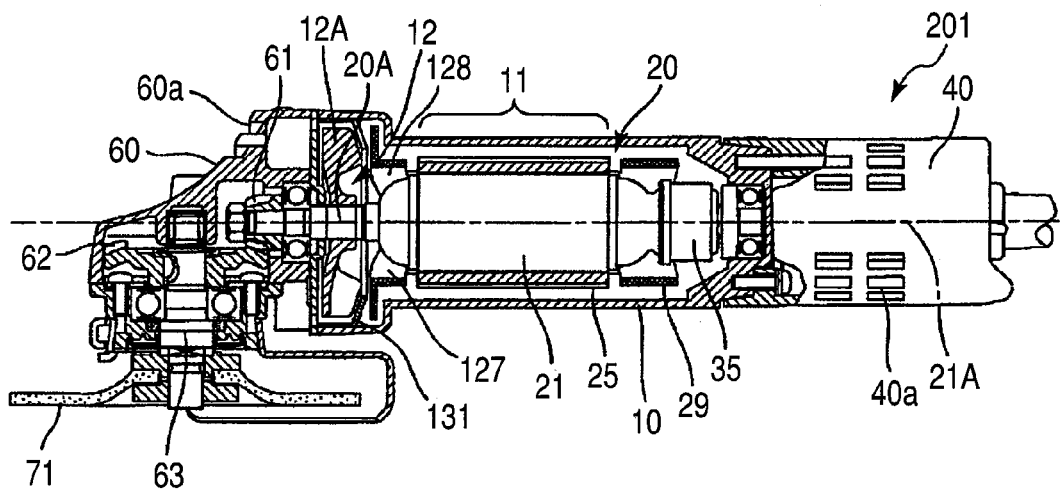
FIG. 11 is a partial sectional view showing a power tool according to a second modification of the embodiment.
Figure 12:
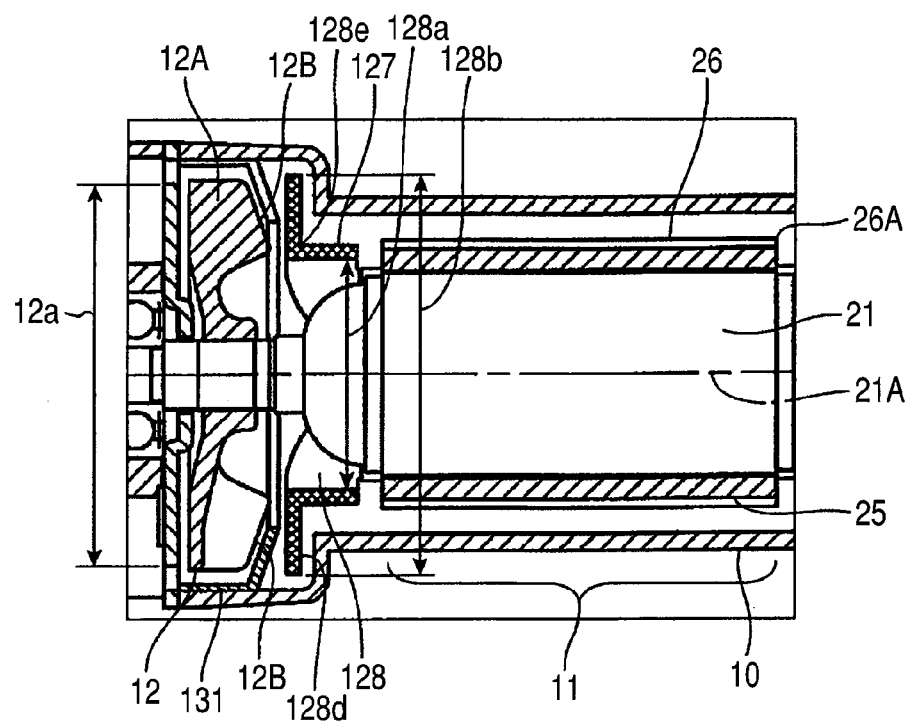
FIG. 12 is a sectional view showing chief parts of the power tool according to a second modification of the embodiment.
Figure 13:
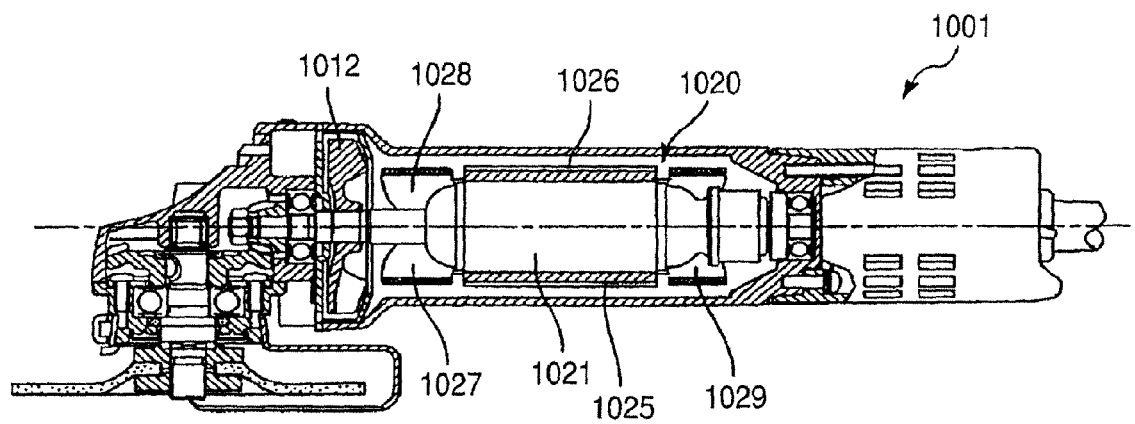
FIG. 13 is a partial sectional view showing a conventional power tool.
Figure 14:
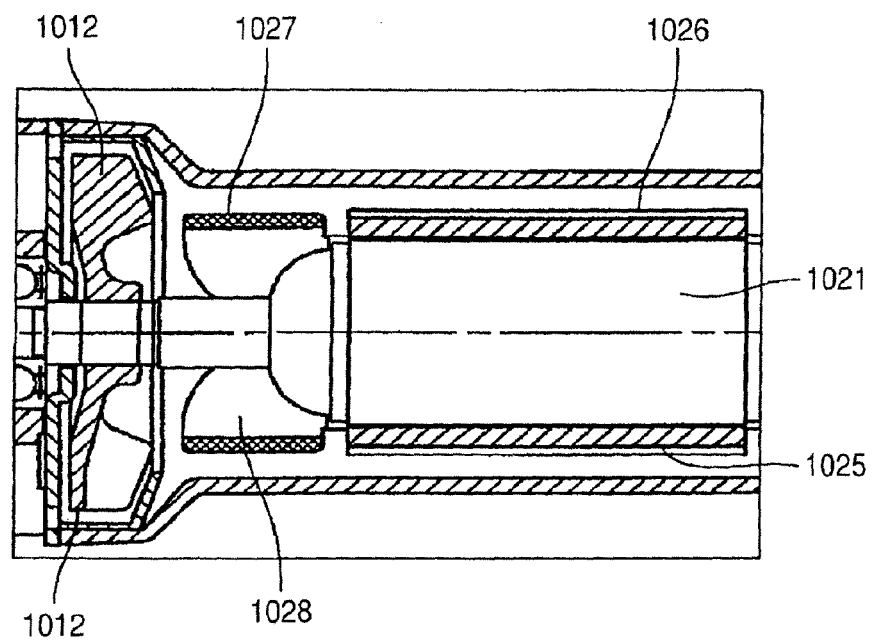
FIG. 14 is a sectional view showing chief parts of the conventional power tool.

In addition to the above-described modification, the shape of the fan-side coil end portion 28 (stator coil bundle 27) may be changed from this embodiment. For example, as shown in FIGS. 11 and 12, a portion ranging from a base of the fan-side coil end portion 128 in the vicinity of the stator core 26 to a coil curved portion 128e in a cross-section 128d of the fan-side coil end portion 128 is parallel to the rotational axis direction (direction of the axis 21A of the stator core 26) of the rotor 21, and a portion ranging from the coil curved portion 128e to an extending end of the fan-side coil end portion 128 extends perpendicularly to the rotational axis direction (direction of the axis 21A of the stator core 26) of the rotor 21 to apart from the rotational axis of the rotor 21. By adopting this configuration, the fan-side coil end portion 128 (stator coil bundle 127) can be made to largely extend in the direction apart from the rotational axis of the rotor 21, and a power tool 201 can be made small in the direction of the axis 21A of the stator core 26.

In this embodiment, the fan wind guide portion 30 which is made of resin constituting a resin mold of the fan-side coil end portion 28 and extends from the fan-side coil end portion 28 is fixed to the fan-side coil end portion 28 by adhesion. Instead of this, a fan wind guide portion which is formed integrally with the resin mold of the fan-side coil end portion 28 can be provided.

Although a two-pole commutator motor using two stator coils has been described in this embodiment, the invention is not limited thereto, and the invention can also be applied to a commutator motor having two or more stator coils.

According to the invention, it is possible to provide a power tool which can prevent dimensions from increasing, raise the cooling efficiency in the coil end portion, and suppress an increase in manufacturing cost.

What is claimed is:

1. A power tool comprising:
   a housing; and
   an electric motor including:
      a stator that is fixed to the housing, the stator including:
         a stator core; and
         a stator coil that is held by the stator core; and
      a rotor that rotates relative to the stator, the rotor including a fan that is fixed relative to a rotor shaft,
   wherein the stator coil includes a coil end portion that protrudes more than the stator core in a direction of the rotor shaft,
   wherein a maximum external diameter of the coil end portion is larger than a maximum external diameter of the stator core,
   wherein the fan includes a plurality of blades,
   wherein the coil end portion is arranged to directly face the plurality of blades of the fan,
   wherein the coil end portion is located between the fan and the stator core, and
   wherein an external diameter of a portion of the coil end portion that is located near the fan is greater than an external diameter of a portion of the coil end portion that is located distant from the fan.

2. The power tool according to claim 1, wherein a maximum external diameter of the fan is greater than the maximum external diameter of the stator core.

* * * * *